Patented Sept. 16, 1952

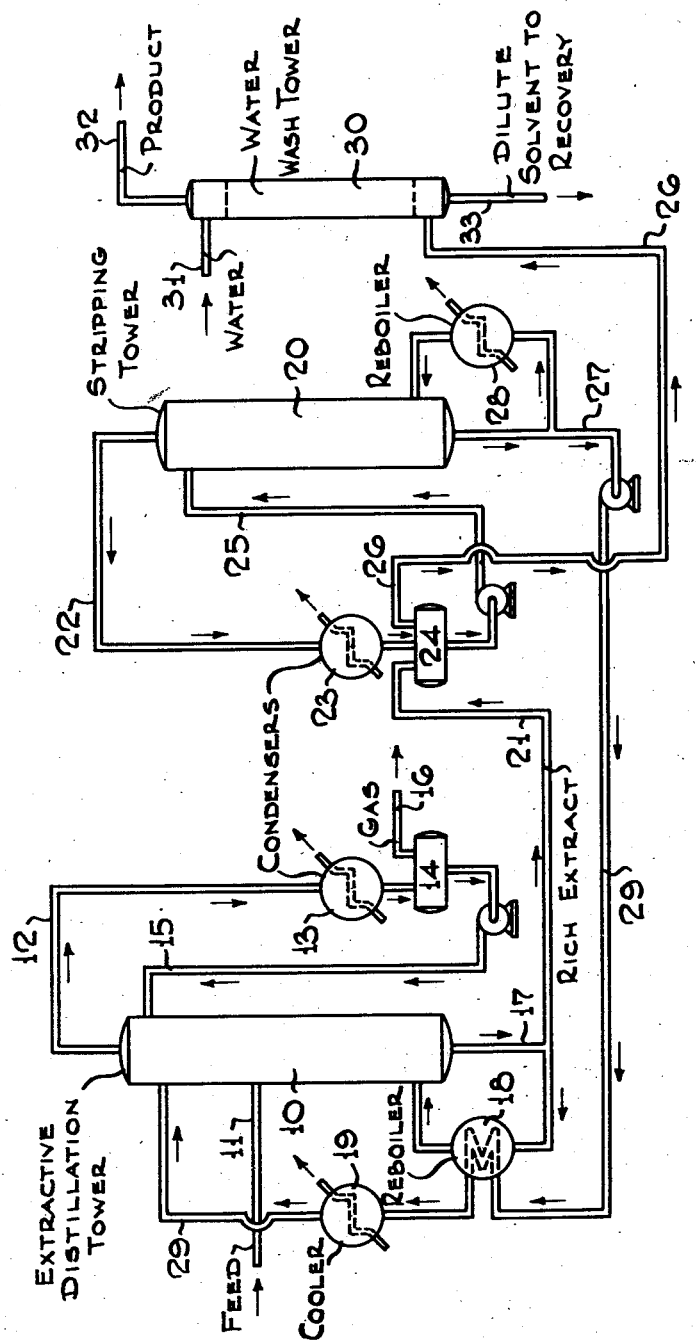

2,610,704

UNITED STATES PATENT OFFICE 2,610,704

SEPARATION OF ETHANE AND ETHYLENE BY EXTRACTIVE DISTILLATION

John A. Patterson, Beverly, N. J., assignor to Standard Oil Development Company, a corporation of Delaware Application July 3, 1947, Serial No. 758,841

5 Claims. (Cl. 183—115)

This invention relates to the separation of low molecular weight unsaturated hydrocarbons from gaseous mixtures containing the low molecular weight hydrocarbons and in particular, to the separation of ethylene from hydrogen and methane as constituents of refinery gases.

The separation of ethylene from refinery gases has become important for the use of the compound as a chemical intermediate in the preparation of chemicals containing the ethyl and substituted ethyl groups. Prior art processing for the separation of ethylene from hydrogen and methane usually involves considerable refrigeration when a high recovery of ethylene is desired. Also, ammoniacal copper solutions have been used for separating the ethylene from such mixtures. In the present invention, ethylene is removed from association with hydrogen and methane and by treating the mixture especially in a distillation zone with a liquid polar solvent alone or in admixture with water.

Processing according to the invention involves subjecting the low molecular weight hydrocarbon gaseous mixtures to the action of a polar, preferably water soluble, solvent, liquid at the temperature of the treatment, to depress the volatility in a distillation zone of ethylene relative to hydrogen and methane. Thus the invention involves treating the low molecular weight hydrocarbon mixture to an extractive distillation in the presence preferably of a non-hydrocarbon polar solvent. In such processing, the solvent is admitted into a distillation zone either with reflux or upon one of the higher plates so that the distillation vapors are countercurrently contacted with the liquid solvent. In this treatment the effects of temperature and pressure have been found to be interrelated. The processing may be conducted at normal temperatures and under pressures of the order of 500 pounds gauge and higher, but preferably temperatures of between 0 and 120° F. and pressures from 200 to 300 pounds per square inch are employed. The higher pressures are employed particularly when products in the liquid form are desired. The absorbed gas may be recovered by heating or reducing the pressure of the solution or the solution may be used directly as the source of ethylene. The solvent may be readily separated from the solution by stripping at lower pressure and/or at higher temperatures.

In order that the invention may be thoroughly understood, the following description and illustration of processing of a refinery gas containing mainly hydrogen, methane, ethylene and ethane may be taken. A typical refinery gas mixture subsequent to a preliminary distillation has the following composition:

| | Per cent |
|---|---|
| Hydrogen | 19.3 |
| Methane | 33.2 |
| Ethylene | 34.3 |
| Ethane | 13.0 |
| Propylene | 0.2 |

Usually the preliminary distillation is effected upon a mixture of this type in order to obtain a more concentrated $C_2$ fraction and remove the bulk of the heavier material. In the description the reference numerals refer to the accompanying drawing in which the flow of materials is indicated through a suitable form of processing equipment.

The feed supply is passed through line 11 at a temperature of 35° F. and pressure of 250 pounds gauge to the distillation equipment, usually a baffle tray tower 10. In order that the feed may have the temperature and pressure as given, passage of the gaseous mixture through pressuring and heat exchange equipment not shown prior to its passage into the line 11 is made. The tower 10 is equipped with an overhead vapor line 12, a condenser 13, a drum 14, a reflux line 15, a distillate withdrawal line 16, a bottoms withdrawal line 17, and a solvent line 29. The tower 10 usually contains about 50 plates. The feed supply passed through line 11 enters the tower 10 on about the 20th plate. The heat is supplied to the tower 10 by means of closed steam coil or the sensible heat of the solvent recycle to the tower as a result of passing a portion of the solution withdrawn through line 17 to the reboiler 18 in which a portion is vaporized by the recycled solvent.

Extractive distillation is carried out in the tower 10 by the passage through either the reflux line 15 or line 29 of the solvent. The solvent employed in this illustration is an aqueous acetone solution containing 96% acetone and 4% water and in an amount to furnish a solvent hydrocarbon ratio of about 2.5 to 3.5 at the top of the tower about the entrance of the solvent. Temperature conditions are maintained in the tower by means of the heating system 18. With the composition of feed mixture is given a temperature of 0° F. at the top of the tower while at the bottom of the tower the temperature is 85° F.

Taken overhead through line 12 is a distillate material of composition:

| | Per cent |
|---|---|
| Hydrogen | 36.6 |
| Methane | 63.0 |
| Ethylene | .4 |
| Ethane | Trace |

This material is passed through the condenser 13 and is cooled to a temperature of −5° F. in order to recover by condensation any vaporized solvent. The condensate is returned to the top of the tower through line 15. The uncondensed portion is passed through line 16 and removed from the system. The liquid removed through line 17 contains the ethylene admixed with solvent in the ratio of 20 pounds of solvent per pound of hydrocarbon. The portion of the stream not passed through the reboiler 18 is withdrawn through line 21 and through the flash drum 24 where the pressure is reduced to 5 pounds per square inch. Most of the ethylene content is vaporized and is removed from the drum through line 26 for subsequent treatment. The unvaporized portion of the extract stream consisting of the acetone-water solvent containing some ethylene is withdrawn from drum 24 and introduced into the stripper tower 20 by line 25.

Tower 20 is shown as an example of distillation equipment and preferably is a baffle tray tower of usual construction containing 20 bubble cap plates. It is provided with a vapor line 22, a partial condenser 23, a bottoms withdrawal line 27, and a reboiler 28. The tower 20 is used to strip the residual ethylene from the acetone-water solvent. The distillation residue withdrawn from line 27 is divided. A portion of the stream is conducted to the reboiler 28, which is heated by means of steam, thus providing the heat for the tower 20. The remainder of the distillation residue is removed through line 29, passed through reboiler 18 previously described and the refrigerated cooler 19, and to the tower 10.

The overhead vapor from the tower 20 which consists of ethylene and some acetone and water is removed through line 22 to the partial condenser 23 where the major part of the acetone and water is condensed. The mixture is conducted to the flash drum 24 previously described where the liquid solvent and vapor ethylene are separated. The ethylene in the vapor phase contains a small amount of solvent due to its partial pressure. This mixture is conducted through line 26 to the extraction equipment 30.

Equipment 30 is shown as being a countercurrent extraction tower and preferably packed with contacting media such as Raschig rings. In tower 30 the purified ethylene is countercurrently contacted with water which dissolves the acetone. The vapor taken overhead through line 32 consists of ethylene vapor in 72% purity at about 1 pound per square inch pressure. The impurities in the ethylene consist of ethane with small amounts of methane and propylene. By subjecting the ethylene product to a subsequent distillation for the removal of the ethane and propylene, a purity of 95% is readily obtainable. The dilute solution of acetone is withdrawn through line 33 for recovery of its acetone content in equipment not shown.

In the invention, the polar solvents which may be most advantageously used are any of the lower molecular weight liquid oxygenated hydrocarbons such as the alcohols, ethers and ketones alone or in admixture with water. In using these solvents, the amount of solvent circulation and the transfer of heat is reduced to a minimum. Also, the need for low subatmospheric temperatures is obviated and solvent lost in the overhead gas is minimized. A particular advantage in the use of the preferable solvents in this invention is that if subatmospheric temperatures are necessary, the need for drying the feed gas is either unnecessary or can be effected by preliminary scrubbing with the solvent itself. In this connection acetone, furfural and their aqueous solutions are particularly desirable solvents for use in this invention. When the solvent employed is hydrocarbon in character, the convenience of nearby sources of ethane, $C_3$, $C_4$, $C_5$ and as high as $C_8$ hydrocarbon streams from cracking and other petroleum refinery operations may be taken.

What is claimed is:

1. A process for separating ethylene and ethane from a gaseous mixture containing hydrogen, methane, ethylene and ethane which comprises subjecting the gaseous mixture to extractive distillation at a pressure of 200 to 300 p. s. i. in an extractive distillation zone in the presence of a solvent selected from the group consisting of acetone, furfural and water solutions thereof, whereby ethylene and ethane are absorbed by the solvent, removing a distillate containing hydrogen and methane from the distillation zone, and removing a solution of ethylene and ethane in said solvent from a bottom portion of the extractive distillation zone.

2. A process according to claim 1 in which the ratio of solvent to gaseous feed mixture is 2.5:1 to 3.5:1.

3. A process according to claim 1 in which the solvent is furfural.

4. A process according to claim 1 in which the solvent is acetone.

5. A process according to claim 1 wherein the ethylene and ethane are recovered from solution in the solvent by reducing the pressure on the solution whereby a portion of the ethylene and ethane are stripped out of the solvent and subsequently distilling the remainder of the ethylene and ethane from the stripped solvent.

JOHN A. PATTERSON.

REFERENCES CITED

The following references are of record in the file of this patent:

UNITED STATES PATENTS

| Number | Name | Date |
|---|---|---|
| 1,422,183 | Curme, Jr. | July 11, 1922 |
| 1,422,184 | Curme | July 11, 1922 |
| 1,938,991 | Wulff | Dec. 12, 1933 |
| 2,190,025 | Hull | Feb. 13, 1940 |
| 2,236,966 | Balthis et al. | Apr. 1, 1941 |
| 2,288,461 | Keith et al. | June 30, 1942 |
| 2,325,379 | Durrum | July 27, 1943 |
| 2,344,969 | Claffey | Mar. 28, 1944 |
| 2,374,104 | Kirkbridge | Apr. 17, 1945 |
| 2,374,984 | Evans et al. | May 1, 1945 |
| 2,383,547 | Hamill et al. | Aug. 28, 1945 |
| 2,407,997 | Patterson | Sept. 24, 1946 |
| 2,434,796 | Hachmuth | Jan. 20, 1948 |
| 2,486,543 | Wenzke | Nov. 1, 1949 |
| 2,542,520 | Hibshman | Feb. 20, 1951 |